United States Patent [19]

Bazin

[11] 4,151,490

[45] Apr. 24, 1979

[54] AUTOMATIC CABLE EQUALIZER CIRCUIT

[75] Inventor: Lucas J. Bazin, Vincentown, N.J.

[73] Assignee: RCA Corporation, New York, N.Y.

[21] Appl. No.: 811,291

[22] Filed: Jun. 29, 1977

[30] Foreign Application Priority Data

Mar. 21, 1977 [GB] United Kingdom ............... 11903/77

[51] Int. Cl.² ........................ H04B 3/14; H04N 9/535
[52] U.S. Cl. ........................................ 333/16; 358/35;
333/18
[58] Field of Search ..................... 358/35, 38, 86, 160,
358/188; 333/15, 16, 17 R, 18; 179/170 A;
325/308, 472; 328/162, 168

[56] References Cited

U.S. PATENT DOCUMENTS

| 2,798,900 | 7/1957 | Bradley | 358/38 |
| 3,079,461 | 2/1963 | Keizer | 358/27 |

Primary Examiner—John C. Martin
Attorney, Agent, or Firm—Eugene M. Whitacre; Paul J. Rasmussen; Robert L. Troike

[57] ABSTRACT

A cable equalizer is provided for automatically compensating a signal for cable attenuation as the length of the cable is varied. The circuit detects changes in a reference signal that is inserted in the signal being transmitted over the cable. Any deviation of the reference signal from its normal state at the receiving end of the cable causes the addition of a correction signal to the signal being transmitted so as to compensate the signal for the cable attenuation.

2 Claims, 3 Drawing Figures

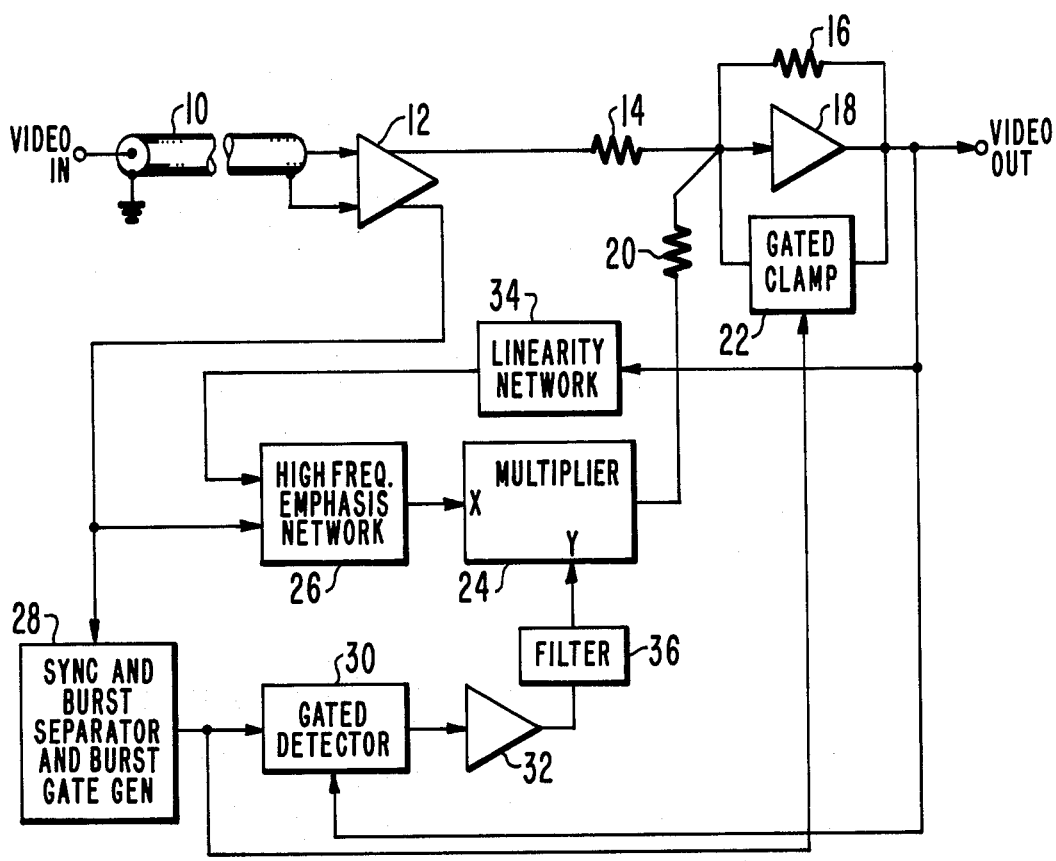
Fig. 1.
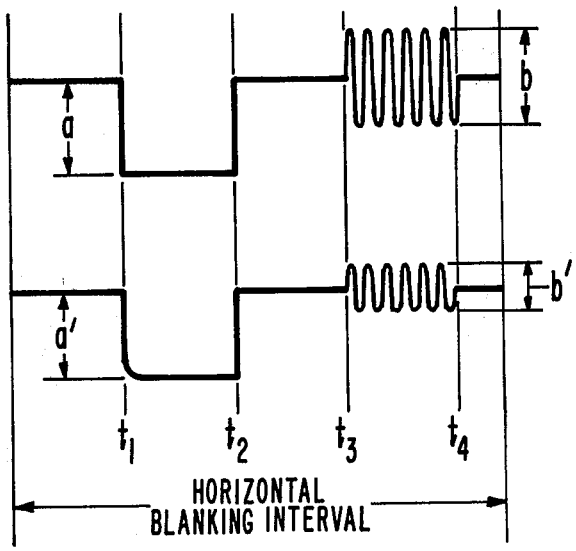
Fig. 2a.
Fig. 2b.
HORIZONTAL BLANKING INTERVAL

AUTOMATIC CABLE EQUALIZER CIRCUIT

BACKGROUND OF THE INVENTION

This invention relates to cable equalizer circuits for compensating signals being transmitted over a cable for cable attenuation losses, and in particular to an automatic cable equilizer for compensating video signals from a television camera.

In the processing of video signals developed, for example, by television cameras located at remote, or widely differing locations, it is often found that the video signal is attenuated by the cable to such an extent that a correction is required to compensate the signal for the cable attenuation. Cable losses may be generally categorized as resistive losses and capacitive or dielectric losses. The first of these, attributed to the resistance value of the cable, causes a relatively linear attenuation over the frequency range of the signal being transmitted and is generally not of significant concern. However, cable losses, attributed to the capacitance of the cable, is of major concern as its affect is to attenuate the higher frequencies of the signal being transmitted. The problem of cable attenuation of the signal is further increased where the length of the cable is varied as often occurs when switching between video sources located at varying distances from the main video processing apparatus. Since a fixed cable compensation will not satisfy the typical video cable installation, it is common practice to view the signal being received on a waveform monitor and manually switch in cable compensation circuits, which, for example, may be in the form of high frequency emphasis networks to compensate for the high frequency losses occurring in the cable.

SUMMARY OF THE INVENTION

A signal cable equalizer circuit is provided for automatically compensating signals transmitted over a cable, wherein the cable signals incur amplitude and frequency response losses during the transmission. The circuit comprises means for including a reference signal having both low and high frequency components in the signal to be transmitted, the reference signal components exhibiting a relative difference in amplitude as a result of transmission losses. Signal summing means are responsive to the cable signals for providing an output signal. Signal processing means are coupled to the cable signals for developing a correction signal derived from the cable signal. Detector means are coupled to the signal summing means for developing a control signal proportional to the relative amplitude difference between the low and high frequency reference signal components. Multiplier means are responsive to the correction signal and the control signal for coupling an amount of the correction signal as determined by the control signal to the signal summing means for restoring the amplitude of the output signal.

BRIEF DESCRIPTION OF THE DRAWINGS

FIG. 1 is a block diagram of an automatic cable equalizer circuit embodying the present invention; and FIGS. 2a & 2b illustrate waveforms useful in understanding the operation of the apparatus shown in FIG. 1.

DESCRIPTION OF THE INVENTION

In FIG. 1, a video signal (Video In) from, for example, a television camera, is coupled to the sending end of a cable 10. Although cable 10 is shown of indeterminent length in the Figure, typical installations may include cable lengths which vary from a few feet up to 1,000 feet or more. The signal at the output of cable 10 is coupled to the input terminals of an amplifier 12. Amplifier 12 is of the type known as a differential amplifier which is particularly advantageous for its ability to reject common mode signals, such as noise induced in the cable, and for its ability to develop two identical output signals, the first of which is coupled by means of resistor 14 to the input of signal summing output amplifier comprising amplifier 18, input resistors 14, 20 and feedback resistor 16. The output terminal of the signal output amplifier provides a convenient terminal (Video Out) from which the video signal from the cable may be coupled to further video processing equipment, not shown. The other output signal from input amplifier 12 is coupled to a high frequency emphasis network 26 and to a sync and burst separator and burst gate generator 28. High frequency emphasis network 26 develops a signal output which is complementary to the signal applied to its input terminal, that is, its amplitude versus frequency response transfer characteristic rises as the frequency of the input signal increases, thereby providing an output signal which increases in amplitude as the frequency of the input signal rises. The characteristics of network 26 are selected so as to provide an amplitude increase which is opposite and equal or complementary to the attenuation the video signal incurs during its transmission over cable 10. The output signal from network 26 is coupled to one input (X) of a multiplier 24 (constructed, for example, from a Motorola MC-1595 integrated circuit). The output of the multiplier 24 is coupled to a second input of the signal summing output amplifier 18 by means of resistor 20. A control signal generated in accordance with the invention, and to be described below, is coupled to the other input (Y) of multiplier 24 to determine the proportion of the above-described complementary correction signal to be added to the attenuated input signal at the input of the video signal output amplifier. Therefore, insofar as described, the attenuated video signal from cable 10 is coupled directly to the signal output amplifier where it has added to it a correction signal equal and opposite to the signal attenuation incurred in transmission over cable 10 so as to provide at the Video Out terminal a video signal in which the amplitude of the output signal is equal to the original signal applied to the input end of cable 10.

The control signal for the (Y) input of multiplier 24 is generated as follows. A reference signal is inserted in the signal to be transmitted over the cable to serve as an index of the loss incurred during transmission. In the illustrated example, wherein the signal being transmitted is a television video signal, this may be conveniently accomplished by including the reference signal in the horizontal blanking interval, although it is feasible to place the reference signal at any desired position in the signal to be transmitted. Since the reference is included in the signal to be transmitted, it is necessary that the reference signal be in a form that will indicate on its arrival at the receiving end of the cable the overall signal attenuation that has occurred, as well as the change in attenuation over the frequency range of the signal due to the varying cable lengths. Therefore, the reference signal to be included contains both a low frequency and high frequency component so as to effectively indicate at the receiving end of cable 10, the relative attenuation over the frequency range of the transmitted signal. If the signal being transmitted is in the form of a composite video signal containing both synchronizing and color burst components, then these signal components, which normally occur during the blanking interval and are at 15,750 Hz and 3.58 MHz, respectively, (U.S. standards) may be advantageously utilized as the reference signal. If the signal being transmitted does not include the horizontal synchronizing and burst signal components, then suitable signal components of similar frequency identity may be inserted to serve as the reference signal. As previously described in connection with the characteristics of cable 10, the attenuation losses may be readily identified by means of this two-part reference signal containing both low and high frequency portions. FIG. 2a illustrates a typical horizontal blanking interval with a horizontal synchronizing component of amplitude "a" occurring at time $t_1$–$t_2$ and a color burst signal of amplitude "b" occurring at time $t_3$–$t_4$. The waveform of FIG. 2a when applied to the input end of cable 10 is attenuated in its transmission so as to appear at the receiving end of the cable 10 in the form illustrated in FIG. 2b. In FIG. 2b, the low frequency component occurring during time $t_1$–$t_2$ is shown as of only slightly reduced amplitude "a'" due to resistive losses with a rounded leading edge due to dielectric losses based on the length of the cable; the high frequency component occurring during the time $t_3$–$t_4$ is shown of significantly reduced amplitude "b'" which is due virtually entirely to the dielectric losses in the cable and is proportional to the length of the cable.

The present invention makes use of the difference or ratio of amplitudes between the low frequency and high frequency components of the reference signal to establish the extent of the cable attenuation due to the attenuation of the high frequency component relative to the low frequency component. This attenuation ratio is a virtual measure of the length of cable over which the signal is being transmitted.

As previously described, the attenuated incoming video signal is applied to the input terminal of sync and burst separator and burst gate generator 28 which separates the horizontal synchronizing component and burst component in a manner well known to those skilled in the art, so as to provide a reference signal gating signal indicating the time occurrence of the reference signals. The output gating signals of separator 28 are coupled to an input of gated detector 30 and to a gated feedback clamp 22 coupled to the signal output amplifier to insure sampling of the attenuated reference signal components only during the desired period of the blanking interval. The other input of gated detector 30 is coupled to the video output terminal. In operation, the attenuated video signal in the main video path Video-In to Video-Out terminals is coupled to two peak detectors, one for sync and one for burst, in gated detector 30. Reference signal gating signals from separator 28 gate the respective peak detectors to provide a D.C. level at the output of gated detector 30, which represents the amplitude difference of sync and burst levels at the output video terminal. The output of detector 30 is coupled to the input terminal of an amplifier 32, filter 36 and, in turn, to multiplier control input (Y). When the D.C. output level of detector 30 equals substantially zero, it indicates that the sync and burst reference component levels are not attenuated which corresponds to zero cable length, and no complementary correction signal is applied to the output video signal amplifier.

As the cable length is increased, the high frequency (burst) component of the reference decreases in amplitude relative to the low frequency (sync) component of the reference; this relative amplitude difference results in a D.C. output level from gated detector 30 reflecting the amplitude difference due to attenuation of the reference signals being transmitted over the cable. Therefore, the D.C. output of detector 30, which changes with cable length, is updated once each television line and automatically adjusts the control voltage at the (Y) input of multiplier 24 to add a correction signal in the form of a complementary signal, so as to restore the low (sync) and high (burst) reference signals to their original values at the input end of cable 10.

Network 26 is typically designed for the largest expected cable length, i.e., 1000', and multiplier 24 thus automatically provides the proper amount of correction for values of cable length from 0 to 1000'. The relatively large amount of cable attenuation compensation required to be provided by high frequency emphasis network 26 may be further linearized in the mid-range values by additional feedback in the form of resistive or a combination of reactive and resistive feedback, as illustrated by linearity network 34 coupled from the output terminal of the signal output amplifier to the input terminal of the traditional high frequency emphasis circuitry.

What is claimed is:

1. A signal cable equalizer circuit for automatically compensating signals transmitted over a cable, said cable signals incurring amplitude and frequency response losses during said transmission, comprising:
   means for including a reference signal having both low and high frequency components in said cable signals to be transmitted, said reference signal components exhibiting a relative difference in amplitude as a result of transmission losses;
   signal summing means responsive to said cable signals for providing an output signal;
   signal processing means coupled to said cable signals for developing a correction signal which is complementary to cable loss for all frequencies transmitted over said cable for a predetermined length of cable derived from said cable signals;
   detector means coupled to said signal summing means for developing a control signal proportional to the relative amplitude difference between said low and high frequency reference signal components; and
   multiplier means responsive to said correction signal and said control signal for coupling an amount of said correction signal as determined by said control signal to said signal summing means for restoring the amplitude of said output signal.

2. A signal cable equalizer circuit according to claim 1 including means coupled between the output of said signal summing means and the input of said signal processing means for coupling said output signal to said signal processing means to provide higher order correction signals to said multiplier means.

* * * * *